United States Patent Office 3,580,938
Patented May 25, 1971

3,580,938
PREPARATION OF DIALKYL GROUP IIIa METAL-DIACYLMETHANE
Wolfram R. Kroll, Linden, N.J., assignor to Esso Research and Engineering Company
No Drawing. Continuation-in-part of application Ser. No. 584,964, Oct. 7, 1966. This application Aug. 29, 1968, Ser. No. 756,282
Int. Cl. C07f 5/00, 5/04, 5/06
U.S. Cl. 260—448A
34 Claims

ABSTRACT OF THE DISCLOSURE

Substantially pure dialkyl metal diacylmethanes such as dialkylaluminum acetylacetonates having excellent catalytic properties can be obtained for the first time in such a high state of purity by reacting stoichiometrically certain Group III metal-tris-diacylmethanes such as aluminum-tris-acetylacetonate with a trialkyl metal such as trialkylaluminum.

CROSS-REFERENCES

This application is a continuation-in-part of Ser. No. 584,964 (now abandoned), filed Oct. 7, 1966, and assigned to the same assignee. The application is related to Ser. No. 585,702 now U.S. Pat. 3,459,721, which covers a use of a pure dialkylaluminum acetylacetonate as a polymerization catalyst.

BACKGROUND OF THE INVENTION

Dialkylaluminum acetylacetonates are alumino-organic chelate components of reaction mixtures which are useful as polymerization catalysts. For example, the in situ complex reaction product of aluminum trialkyls with acetylacetone is particularly suitable for the polymerization of acrylonitrile, as described in U.S. Pat. No. 3,231,553 to Chiang, and for the polymerization of epoxides as described in U.S. patent to Vandenberg, No. 3,135,706. In the processes of the art, the dialkylaluminum acetylacetonate is part of a reaction mixture and is prepared in situ by reacting (chelating) an aluminum trialkyl with acetylacetone. The pure compound is not separated from the reaction mixture. Thus, the reaction mixture, itself, as prepared with mixed aluminum compound impurities, is used as the catalyst.

BRIEF SUMMARY OF THE INVENTION

It has now been found, and forms the basis for this invention, that dialkyl-metal-diacylmethanes such as dialkyl-aluminum acetylacetonate can be produced and obtained in a substantially pure form by reacting metal-tris-(diacylmethanes), such as aluminum-tris-acetylacetonate, with a trialkylaluminum in stoichiometric quantities. The reaction is exemplified by the following equation for a highly preferred species of the invention:

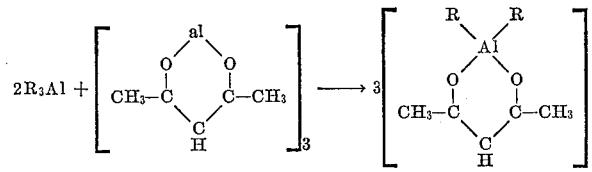

where R may be any $C_1$ to $C_{30}$ alkyl group, preferably from 1 to 15 and most preferably, 1 to 10 carbon atoms.

DETAILED DESCRIPTION WITH PREFERRED EMBODIMENTS

The diacylmethanes of the invention have the general formula:

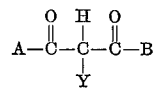

wherein A and B are each selected from the group consisting of alkyl ($C_1$ to $C_6$), aryl and alkylaryl ($C_6$ to $C_{10}$) and cycloalkyl ($C_5$ to $C_8$)—Y is selected from hydrogen, $C_1$ to $C_6$ alkyl, $C_6$ to $C_{10}$ aryl and alkylaryl and $C_5$ to $C_8$ cycloalkyl. Suitable examples include acetylacetone, dbizenoylmethane, 3,5 - diketo - 4 - methylheptane, 2,4-diketo - 3 - phenyl - pentane, benzoyl-acetone, and the like. The generic formula of the product of this invention is as follows:

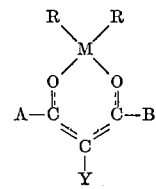

wherein M is a Group IIIa metal and wherein A and B are each selected from the group consisting of alkyl ($C_1$ to $C_6$), aryl and alkylaryl ($C_6$ to $C_{10}$) and cycloalkyl ($C_5$ to $C_8$)—Y is selected from hydrogen, $C_1$ to $C_6$ alkyl, $C_6$ to $C_{10}$ aryl and alkyl aryl and $C_5$ to $C_8$ cycloalkyl.

While aluminum is the most preferred metal because of its inexpensiveness and easy availability, other metals of Group IIIa of the Periodic Table such as boron, gallium, indium and thallium can also be used. For purposes of this specification, the symbol M will be taken to be generic to the listed metals.

Some of the specific alkyl groups of the metal alkyl compounds which can be used are ethyl, methyl, propyl, isobutyl, phenyl, vinyl, cyclopentadienyl and the like.

For purposes of convenience and for illustrating the most preferred specific embodiment of the invention, the acetyl acetonate species of diacylmethane and the aluminum metal species will be used extensively hereinafter. But it is to be understood that these are species of the more generic embodiment set forth above.

The alkyl and diacylmethane, i.e. acetylacetonate reactants of the invention are normally used in the form of solutions. Generally, the concentration of the active portion of the solutions is not critical so long as the proper stoichiometric proportions are used to obtain the desired degree of reaction. The reaction is so quick and clean that when stoichiometric quantities of reactants are used, essentially 100% conversion is effected. Thus, there are no contaminants in the reaction mixture.

Any solvent that will satisfactorily dissolve the reactants can be used. Typical solvents for this reaction are $C_4$ to $C_{25}$ aliphatic compounds, such as propane, hexane, dodecane, etc., and $C_6$ to $C_{50}$ aromatic hydrocarbons, such as benzene, xylene, naphthene, alkyl benzenes, etc. Of course, it is clear that substituted derivatives of these solvents can also be used.

When using a non-polar diluent such as the above, it is important that the aluminum trialkyl solution be added to the aluminum-tris-acetylacetonate solution, otherwise the desired compound will react further. If the aluminum-tris-acetylacetonate is added to the trialkylaluminum, a Grignard type of addition reaction takes place leading to undesired products.

As another facet of the invention, it has also been found that the desired exchange reaction can also be carried out if a trialkylaluminum complexed with a Lewis Base is employed. Lewis Bases are substances with a lone electron pair which can be shared with a Lewis acid. See Valence and the Structure of Atoms and Molecules, 142, Chemical Catalogue Co., New York (1923). Typical Lewis Bases are ethers, such as diethyl ether or tetrahydrofuran, p-dioxane, anisole, or tertiary amines such as triethylamine, etc. These bases are also solvents.

The Lewis base complex can be prepared by mixing stoichiometric amounts of Lewis base to the trialkylaluminum. Instead of preparing the Lewis base complex in a separate step, it is often convenient to mix at least stoichiometric amounts of the Lewis base with the solvent employed. The use of these Lewis base adducts has several advantages. For one thing, it eliminates the necessity of mixing the reagents in a certain order as mentioned above. It also cuts down on possible side reactions (e.g. Grignard Type of reaction). After completion of the reaction, the mixture can be used as is for catalysts, surface coating intermediates or the like. Alternatively, the Lewis base can be removed with the solvent by distillation. While the reaction mixture is so free of side products that it can be used in solvent for uses such as catalysis of alkylene oxide polymerization, preparation of hydrogenation catalysts, surface coating intermediates and the like, under some circumstances, the product free of solvent may be desired. In such circumstances, the simple expedient of distillation can be used.

Upon distillation at atmospheric or subatmospheric pressure, dialkylaluminum acetylacetonate is also obtained in high yield. It was unexpected that dialkylaluminum acetylacetonate would be stable under distillation conditions because of the well-known tendency of aluminum organic compounds to act as reducing agents, which ordinarily would lead to the destruction of the chelate structure. The dialkylaluminum acetylacetonate can be distilled as long as the alkyl group is short enough so that the product distills below the decomposition temperature of the dialkylaluminum acetylacetonate. The distilled products are soluble in aromatic, aliphatic and polar solvents without decomposition and are particularly useful as one of the components in catalyst systems for the polymerization of alkylene oxides and other epoxides.

The distillation is generally carried out at a pressure of from atmospheric to $1 \times 10^{-7}$ torr, preferably 400 torr to $1 \times 10^{-4}$ torr, and most preferably 150 torr to $1 \times 10^{-3}$ torr at a temperature of 0° C. to 300° C., preferably 20° C. to 200° C., and most preferably 30° C. to 150° C.

One torr is equal to 1 mm. of mercury. The reaction itself will proceed over a wide range of convenient temperatures and pressures. It can be normally carried out at ordinary ambient temperatures and pressures, i.e. those usually present in the average laboratory or industrial installation. Thus, temperatures from −20 to +60° C., preferably 0 to 50, and most preferably 15 to 45° C., can be utilized. Also, different pressures can be used although normally it is most convenient to proceed at ambient pressures.

By substantially pure dialkylaluminum acetylacetonates it is meant such a compound which has no more than 5 wt. percent based on said acetylacetonate of an organoaluminum compound impurity.

It should be noted that the substantially pure dialkylaluminum acetylacetonate is a very much more efficient catalyst component than the impure reaction mixture commonly used according to the art.

Another important feature of this invention is that instead of a pure trialkylaluminum $R_3Al$, one can also use a "Growth Product" as obtained by the reaction of $R_3Al$ with ethylene (cf. K. Ziegler et al., Liebigs Ann. Chem. 629, 121 (1960)) in which alkyl groups with different chain length are attached to the aluminum as represented by the formula:

Such a growth product would react with aluminum-trisacetylacetonate with formation of a different type of dialkylaluminum acetylacetonate in which the two alkyl groups are different, as e.g.

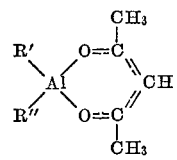

These structures have certain advantages as they are less sensitive to oxygen and moisture.

Another separate but important feature of this invention resides in the fact that the dialkyl reaction products can be further reacted with metal chlorides such as $SnCl_4$ to give useful products exemplified by the following reaction:

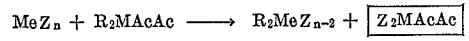

wherein Me is selected from the group consisting of Group IVa metals, i.e. silicon, germanium and tin and wherein Z is a halogen. (AcAc is an abbreviation for acetylacetonate.) Tin (Sn) is particularly preferred. Chlorine is particularly preferred.

The material in the box behaves in many respects as an $AlCl_3$ and thus can be considered a Friedel Crafts catalyst. However, it is hydrocarbon soluble which gives it an enormous edge over conventional Friedel Craft materials.

In order to illustrate the invention with greater particularity, the following specific examples are given, it being understood that they are intended to be only illustrative and not limitative.

EXAMPLE 1

A solution of trimethylaluminum (.64 M) in 200 ml. benzene was added slowly under stirring to a solution of aluminum-tris-acetylacetonate (.3 M) in 350 ml. benzene at ambient temperature. After removal of the benzene solvent by distillation at 20 mm. of Hg at ambient temperature, most of the remaining metal organic product was distilled off at 82° C. and at 15 mm. of Hg until 105 g. of product was recovered. Solvent removal was accomplished here and in the other examples for the specific purpose of product characterization by various analytical techniques. The dimethylaluminum acetylacetonate had a melting point of 28–29° C. and a boiling point of 82° C. at 15 mm. of Hg. Analysis by NMR, IR, molecular weight, as well as carbon, hydrogen and aluminum analysis agreed with the structure of a dimethylaluminum acetylacetonate of the following formula:

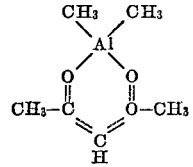

EXAMPLE 2

A solution of tri-isobutylaluminum (.3 M) in 130 ml. benzene was slowly added under stirring to a solution of aluminum-tris-acetylacetonate (.16 M) in 250 ml. benzene. Subsequently, the benzene was removed at reduced pressure of 20 mm. of Hg at ambient temperature. The remaining product was distilled at 39° C. at the reduced pressure of .008 mm. of Hg until 87 g. of product was recovered. Aluminum analysis, NMR and IR analysis confirmed that the structure of the product was that of a di-isobutylaluminum acetylacetonate. Molecular weight determinations in benzene showed that the product was monomeric.

EXAMPLE 3

84.8 g. of aluminum-tris-acetylacetonate was added to 400 ml. benzene resulting in a solution. To this solution was added slowly at ambient temperature, a solution of 57.1 g. triethylaluminum in benzene. After the reaction the benzene was removed at ambient temperature and by a reduced pressure of 10–20 mm. of Hg. The reaction product was distilled at a bath temperature of 88° C. and a temperature of 3.5 mm. Hg to result in a product having a boiling point of 72° C. at 3.5 mm. Hg. The distillate was identified by analysis (percent Al, NMR, IR) as diethylaluminum acetylacetonate. The yield of the distilled, pure diethylaluminum acetylacetonate was 62%.

EXAMPLE 4

To 1 millimole of a 1:1 p-dioxane complex with trimethylaluminum in benzene was added 1 millmole of aluminum-tris-acetylacetonate in benzene. An almost immediate exchange took place. The reaction products were found by NMR analysis to be .5 millimole of aluminum-tris-acetylacetonate and 1.5 millimoles of dimethylaluminum acetylacetonate.

This example demonstrates that the preparation of the dialkylaluminum acetylacetonates can be accomplished by using complexes of the trialkylaluminum instead of the free trialkylaluminum. In this case, the complex between the trimethylaluminum and p-dioxane was used. Instead of using exactly the 1:1 etherate, the same can be accomplished by having an ether (or another Lewis base) present as co-solvent. This example further demonstrates that even if a 1:1 molar ratio of trialkylaluminum and aluminum-tris-acetylacetonate is used, the resulting products are only the dialkylaluminum acetylacetonate and aluminum-tris-acetylacetonate whereas an equimolar amount of dialkylaluminum acetylacetonate and alkyl-aluminum-bis-acetylacetonate is expected. Unexpectedly, but beneficially, the alkylaluminum-bis-acetylacetonate is not stable.

EXAMPLE 5

This experiment was exactly like Example 4, except that an excess of diethyl ether was used instead of a stoichiometric amount of p-dioxane. The etherate of trimethylaluminum (6 millimoles) in a mixed solvent of ether and benzene was reacted with a slurry of tris-aluminum-acetylacetonate (3 millimoles) in ether. A homogeneous solution was obtained which was subjected to reduction of pressure, i.e. 20 mm. Hg at room temperature. After the removal of all solvents, the remaining liquid was analyzed. It was found to be pure dimethylaluminum acetylacetonate. Thus, this example showed that the preparation can be done in the presence of excess ether and that the ether can be removed quantitatively under mild conditions. Again, this result was unexpected, but beneficially so, as aluminum organic compounds in many cases form Lewis base adducts which make an isolation of the free aluminum organic compound difficult or impossible.

The nature of the present invention having thus been fully set forth and examples of the same given, what is claimed as new, useful and unobvious and desired to be secured by Letters patent is:

What is claimed is:

1. Process for preparing a pure dialkyl-Group IIIa metal-diacylmethane which comprises:
   (a) adding a first solution of a Group IIIa metal alkyl having the formula $R_3M$ in a non-reactive solvent; to a second solution of a stoichiometric proportion of a Group IIIa metal-tris-(diacylmethane) in a non-reactive solvent to form a reaction product in a mixed solution; wherein
   (b) R is independently selected from the group consisting of $C_1$ to $C_{30}$ alkyl radicals, M is a Group IIIa metal; and
   (c) said diacylmethane has the formula

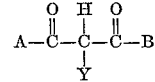

wherein A and B are independently selected from the group consisting of $C_1$ to $C_6$ alkyl; $C_6$ to $C_{10}$ aryl, alkylaryl and arylalkyl; and $C_5$ to $C_8$ cycloalkyl radicals; Y is selected from the group consisting of hydrogen, A and B; and
   (d) distilling said mixed solution to remove said non-reactive solvent and recover said dialkyl-Group IIIa metal-diacylmethane substantially free of non-reactive solvent and impurities.

2. The process of claim 1 wherein said mixed solution is distilled at sub-atmospheric pressure to remove said solvent and recover said dialkyl-Group IIIa metal-diacylmethane.

3. The process of claim 1 wherein said Group IIIa metal is aluminum.

4. The process of claim 1 wherein said diacylmethane is acetylacetone.

5. The process of claim 1 wherein said $R_3M$ is trimethylaluminum.

6. The process of claim 1 wherein said $R_3M$ is triethylaluminum.

7. The process of claim 1 wherein said $R_3M$ is triisobutyl aluminum.

8. The process of claim 1 wherein said stoichiometric proportion consists essentially of two moles of $R_3M$ and one mole of Group IIIa metal-tris-(diacylmethane).

9. Process for preparing a solution of a dialkyl-Group IIIa metal-diacylmethane which comprises:
   (a) adding a solution of a Group IIIa metal alkyl having the formula $R_3M$ in a non-reactive solvent to a solution of a stoichiometric proportion of a Group IIIa metal-tris-(diacylmethane) in a non-reactive solvent to form a reaction product; wherein
   (b) R is independently selected from the group consisting of $C_1$ to $C_{30}$ alkyl radicals, M is a Group IIIa metal; and
   (c) said diacylmethane has the formula

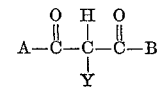

wherein A and B are independently selected from the group consisting of $C_1$ to $C_6$ alkyl; $C_6$ to $C_{10}$ aryl, alkylaryl and arylalkyl; and $C_5$ to $C_8$ cycloalkyl radicals; Y is selected from the group consisting of hydrogen, A and B; and
   (d) recovering a solution of said reaction product consisting essentially of a dialkyl-Group IIIa metal-diacylmethane in said non-reactive solvent.

10. Process of claim 9 wherein said Group IIIa metal is aluminum.

11. Process of claim 9 wherein said diacylmethane is acetylacetone.

12. The process of claim 9 wherein said $R_3M$ is trimethyl aluminum.

13. The process of claim 9 wherein said $R_3M$ is triethyl aluminum.

14. The process of claim 9 wherein said $R_3M$ is triisobutyl aluminum.

15. The process of claim 9 wherein said stoichiometric proportion consists essentially of two moles of $R_3M$ and one mole of Group IIIa metal-tris-(diacylmethane).

16. Process for preparing a pure dialkyl-Group IIIa metal-diacylmethane which comprises:

(a) mixing a solution of a Group IIIa metal alkyl having the formula R₃M in a non-reactive solvent with at least one stoichiometric proportion of a Lewis base to form a complex in solution;
(b) mixing said solution of said complex with a stoichiometric proportion of a Group IIIa metal-tris-(diacylmethane) in a non-reactive solvent to form a reaction product in a mixed solution; wherein
(c) R is independently selected from the group consisting of C₁ to C₃₀ alkyl radicals, M is a Group IIIa metal; and
(d) said diacylmethane has the formula

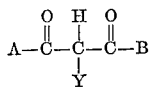

wherein A and B are independently selected from the group consisting of C₁ to C₆ alkyl; C₆ to C₁₀ aryl, alkylaryl and arylalkyl; and C₅ and C₈ cycloalkyl radicals; Y is selected from the group consisting of hydrogen; and A and B;
(e) distilling said mixed solution to remove said non-reactive solvent and said Lewis base and recover said dialkyl-Group IIIa metal-diacylmethane substantially free of solvent, Lewis base and impurities.

17. The process of claim 16 wherein said mixed solution is distilled at sub-atmospheric pressure to remove said solvent and said Lewis base, and recover said dialkyl-Group IIIa metal-diacylmethane substantially free of impurities.

18. The process of claim 16 wherein said Group IIIa metal is aluminum.

19. The process of claim 16 wherein said diacylmethane is acetylacetone.

20. The process of claim 16 wherein said R₃M is trimethylaluminum.

21. The process of claim 16 wherein said R₃M is triethylaluminum.

22. The process of claim 16 wherein said R₃M is triisobutyl aluminum.

23. Process of claim 16 wherein said proportion of Lewis base is equal to or greater than one mole of Lewis base per mole of R₃M.

24. Process of claim 16 wherein said stoichiometric proportion of R₃M - Lewis-base-complex consists essentially of two moles of said complex to one mole of said Group IIIa metal-tris-(diacylmethane).

25. Process of claim 16 wherein said Lewis base is selected from the group consisting of diethyl ether, tetrahydrofuran, p-dioxane, anisole and triethylamine.

26. Process for preparing a solution of a dialkyl-Group IIIa metal - diacylmethane containing a stoichiometric proportion of a Lewis base which comprises:
(a) mixing a solution of a Group IIIa metal alkyl having the formula R₃M in a non-reactive solvent with at least one stoichiometric proportion of a Lewis base to form a complex in solution;
(b) mixing said solution of said complex with a stoichiometric proportion of a Group IIIa metal-tris-(diacylmethane) in a non-reactive solvent to form a reaction product in a mixed solution; wherein
(c) R is independently selected from the group consisting of C₁ to C₃₀ alkyl radicals, M is a Group IIIa metal; and
(d) said diacylmethane has the formula

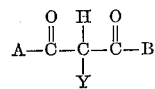

wherein A and B are independently selected from the group consisting of C₁ to C₆ alkyl; C₆ to C₁₀ aryl, alkylaryl and arylalkyl; and C₅ to C₈ cycloalkyl radicals; Y is selected from the group consisting of hydrogen, A and B; and
(e) recovering a solution of said dialkyl-Group IIIa metal-diacylmethane.

27. The process of claim 26 wherein said Group IIIa metal is aluminum.

28. The process of claim 26 wherein said diacylmethane is acetylacetone.

29. The process of claim 26 wherein said R₃M is trimethylaluminum.

30. The process of claim 26 wherein said R₃M is triethylaluminum.

31. The process of claim 26 wherein said R₃M is triisobutyl aluminum.

32. The process of claim 26 wherein said proportion of Lewis base is equal to or greater than one mole of Lewis base per mole of R₃M.

33. Process of claim 26 wherein said stoichiometric proportion of R₃M - Lewis-base-complex consists essentially of two moles of said complex to one mole of said Group IIIa metal-tris-(diacylmethane).

34. Process of claim 26 wherein said Lewis base is selected from the group consisting of diethyl ether, tetrahydrofuran, p-dioxane, anisole and triethylamine.

References Cited

UNITED STATES PATENTS

| | | | |
|---|---|---|---|
| 3,036,103 | 5/1962 | Johnson | 260—448AX |
| 3,103,526 | 9/1963 | Jenkner | 260—448AX |
| 3,180,838 | 4/1965 | Chiang | 260—448BUX |
| 3,219,591 | 11/1965 | Vandenberg | 260—448BUX |
| 3,458,483 | 7/1969 | Dubsky et al. | 260—448BX |

OTHER REFERENCES

Bogdanovic, Angew, Chem. vol. 77, No. 22, November 1965.

Coates, Organo-Metallic Compounds, John Wiley & Sons, Inc., New York pp. 151, 155 and 161 (1960).

Koster et al., Ann. Der Chem., vol. 689, pp. 40, 42, 46 to 48 and 56 (1965).

TOBIAS E. LEVOW, Primary Examiner

H. M. S. SNEED, Assistant Examiner

U.S. Cl. X.R.

252—431R; 260—429J, 429R, 448B, 462R